United States Patent [19]

Iimura et al.

[11] Patent Number: 5,150,237
[45] Date of Patent: Sep. 22, 1992

[54] LIQUID CRYSTAL DISPLAY ELEMENT

[75] Inventors: Haruo Iimura, Yokohama; Yasuyuki Takiguchi, Kawasaki; Akihiko Kanemoto, Yokohama, all of Japan

[73] Assignee: Ricoh Company, Ltd., Tokyo, Japan

[21] Appl. No.: 522,378

[22] Filed: May 11, 1990

[30] Foreign Application Priority Data

May 15, 1989 [JP] Japan .................. 1-121048
Jun. 6, 1989 [JP] Japan .................. 1-143594

[51] Int. Cl.$^5$ .................................................. G02F 1/13
[52] U.S. Cl. ........................................ 359/73; 359/63; 359/92; 359/93
[58] Field of Search ............... 350/335, 339 R, 337, 350/339 F, 347 R, 347 E; 359/63, 53, 73, 92, 93, 106

[56] References Cited

U.S. PATENT DOCUMENTS

| | | | |
|---|---|---|---|
| 4,080,046 | 3/1978 | Nishizaki | 350/347 R |
| 4,385,806 | 5/1983 | Fergason | 359/73 |
| 4,396,250 | 8/1983 | Wada et al. | 350/335 |
| 4,443,065 | 4/1984 | Funada et al. | 359/93 |
| 4,466,702 | 8/1984 | Wiener et al. | 350/347 R |
| 4,533,214 | 8/1985 | Penz et al. | 350/337 |
| 4,701,028 | 10/1987 | Clerc et al. | 350/347 E |
| 4,844,569 | 7/1989 | Wada et al. | 350/335 |
| 4,904,058 | 2/1990 | Kato et al. | 359/53 |
| 4,906,073 | 3/1990 | Hunahata et al. | 350/335 |
| 4,909,606 | 3/1990 | Wada et al. | 350/347 E |
| 4,936,654 | 6/1990 | Suzaki et al. | 350/347 E |
| 4,957,349 | 9/1990 | Clerc et al. | 350/347 R |
| 4,973,137 | 11/1990 | Kozaki | 350/339 R |
| 4,984,873 | 1/1991 | Takiguchi et al. | 350/347 R |
| 4,995,704 | 2/1991 | Yamamoto et al. | 350/347 R |
| 5,016,988 | 5/1991 | Iimura | 350/347 R |
| 5,039,185 | 8/1991 | Uchida et al. | 359/93 |
| 5,056,896 | 10/1991 | Iimura et al. | 359/93 |

FOREIGN PATENT DOCUMENTS

| | | | |
|---|---|---|---|
| 0284372 | 9/1988 | European Pat. Off. | 350/347 R |
| 0311405 | 4/1989 | European Pat. Off. | 350/347 R |
| 0312297 | 4/1989 | European Pat. Off. | 350/347 R |
| 0341702 | 11/1989 | European Pat. Off. | 350/347 R |
| 0128319 | 8/1982 | Japan | 350/345 |
| 0121033 | 6/1986 | Japan | 350/334 |
| 0145216 | 6/1987 | Japan | 350/334 |
| 0159117 | 7/1987 | Japan | 350/347 R |
| 0210934 | 8/1989 | Japan | 350/347 R |
| 0217315 | 8/1989 | Japan | 350/347 R |
| 1462978 | 1/1977 | United Kingdom | 350/347 R |

OTHER PUBLICATIONS

Iimura et al—"STN-LCD With improved Viewing Angle Characteristics Using a Birefringent Film" SID 89 Digest—vol. XX—May 1989—pp. 398-401.

Primary Examiner—Rolf Hille
Assistant Examiner—Tan Ho
Attorney, Agent, or Firm—Oblon, Spivak, McClelland, Maier & Neustadt

[57] ABSTRACT

A liquid crystal display element has a liquid crystal cell contructed such that a liquid crystal layer composed of a liquid crystal composition having a positive dielectric anisotropy is homogeneously oriented between a pair of substrates provided with electrodes; a pair of polarizers disposed such that the liquid crystal layer is arranged between the polarizers; and a uniaxial medium disposed at least one of clearances between the liquid crystal layer and the both polarizers, the uniaxial medium having a positive optical anisotropy and an optical axis in a direction perpendicular to a substrate face. In the liquid crystal display element, products of refractive index anisotropy and thickness of the uniaxial medium are different from each other in accordance with the difference between displayed colors determined every display picture element.

8 Claims, 4 Drawing Sheets

LIQUID CRYSTAL DISPLAY ELEMENT

BACKGROUND OF THE INVENTION

1. Field of the Invention

The present invention relates to a liquid crystal display element. More particularly, the present invention relates to a liquid crystal display element of an ECB (electrically controlled birefringence) type in which a crystal having a positive dielectric anisotropy is homogeneously oriented.

2. Description of the Related Art

A so-called liquid crystal element of the ECB type electrically controlled and using a birefringent effect has a liquid crystal cell supporting a liquid crystal layer between upper and lower substrates so as to homogeneously orient a liquid crystal molecule. A polarizer is disposed on both sides of this liquid crystal cell in a state in which a transmission or absorption axis of the polarizer in proximity to the liquid crystal layer is shifted from the orientation direction of the liquid crystal molecule. The liquid crystal cell is colored by using the birefringent nature of the liquid crystal molecule. A displayed color is changed by applying a voltage to the liquid crystal layer in accordance with the orientation state of the liquid crystal layer.

However, in such a liquid crystal display element of the ECB type, the distance of light really transmitted through the liquid crystal layer is changed in accordance with visual angle and the amount of apparent birefringence is changed in accordance with a relative angle between the visual angular direction and the orientation direction of the liquid crystal molecule. Therefore, the displayed color is greatly changed in accordance with the visual angular direction.

SUMMARY OF THE INVENTION

It is therefore an object of the present invention to provide a liquid crystal display element of the ECB type in which the change in displayed color caused by the visual angle is greatly reduced and display quality is excellent.

The above object of the present invention can be achieved by a liquid crystal display element comprising a liquid crystal cell constructed such that a liquid crystal layer composed of a liquid crystal composition having a positive dielectric anisotropy is homogeneously oriented between a pair of substrates provided with electrodes; a pair of polarizers disposed such that the liquid crystal layer is arranged between the polarizers; and a uniaxial medium disposed at least one of clearances between the liquid crystal layer and the both polarizers, the uniaxial medium having a positive optical anisotropy and an optical axis in a direction perpendicular to a substrate face.

The uniaxial medium having the above-mentioned features is formed by cutting e.g., a monocrystal having a positive optical anisotropy in a direction perpendicular to the optical axis. The uniaxial medium having the above-mentioned features is also formed by a liquid crystal cell constructed such that a homeotropic orientation is provided between the substrates with respect to the liquid crystal layer composed of a liquid crystal composition having a negative dielectric anisotropy. Further, the uniaxial medium having a positive optical anisotropy can be formed by distorting a polymer, etc., thermally or mechanically.

In the above liquid crystal display element, products of refractive index anisotropy and thickness of the uniaxial medium are different from each other in accordance with the difference between displayed colors determined every display picture element.

The uniaxial medium having the above features is formed by e.g., a liquid crystal cell constructed such that a homeotropic orientation is provided with respect to the liquid crystal layer composed of a liquid crystal composition having a negative dielectric anisotropy between the substrates having recessed and projected portions on surfaces thereof. The uniaxial medium having a positive optical anisotropy can be formed by distorting a polymer, etc., thermally or mechanically. Further, the uniaxial medium having the above features can be made by partially changing the thickness thereof thermally, chemically or mechanically. Otherwise, the uniaxial medium having the above features can be made by partially changing the refractive index anisotropy thereof.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a liquid crystal display element in the present invention will next be described in detail with reference to the accompanying drawings.

Figure 1:
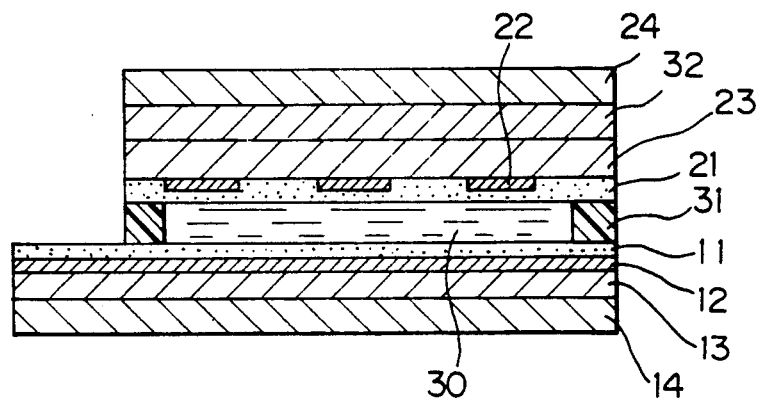
FIG. 1 is a cross-sectional view showing the construction of a liquid crystal display element in an embodiment of the present invention.

FIG. 1 is a cross-sectional view showing the construction of a liquid crystal display element in an embodiment of the present invention. In this figure, a liquid crystal layer 30 is supported between lower and upper substrates 13 and 23 in which transparent electrodes 12, 22 and orientation films 11, 21 are formed. The liquid crystal layer 30 is separated by a seal material 31 from the exterior of the liquid crystal display element, thereby forming a liquid crystal cell. A liquid crystal molecule of the liquid crystal layer 30 is approximately parallel to the substrates 13 and 23 by the orientation films 11 and 21 and is homogeneously oriented between these lower and upper substrates 13 and 23. If necessary, a gap material may be mixed with the liquid crystal layer 30 or the seal material 31 to constantly hold the thickness of the liquid crystal layer 30.

Polarizers 14 and 24 are disposed on the outermost side of the liquid crystal cell formed as above. In this embodiment, a uniaxial medium 32 having a positive optical anisotropy is arranged between the upper polarizer 24 and the upper substrate 23, but may be arranged between the lower polarizer 14 and the lower substrate 13, or may be arranged on both sides of the liquid crystal cell. The object of the present invention can be also achieved by a liquid crystal display element constructed by using the uniaxial medium having a positive optical anisotropy and the above-mentioned features as at least one substrate of the liquid crystal cell.

Figure 2:
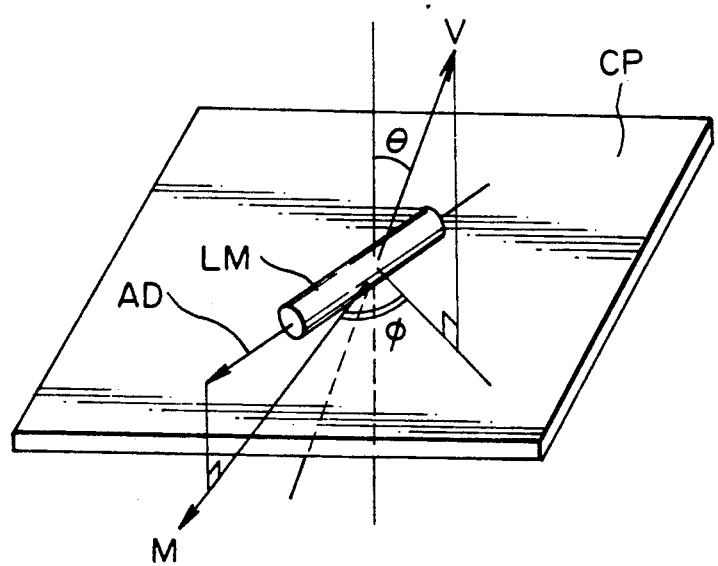
FIG. 2 is a view showing the definition of angles to explain an operating effect of a uniaxial medium having a positive optical anisotropy in the liquid crystal display element of the present invention.

Angles with respect to a visual angular direction are defined as shown in FIG. 2 to explain an operating effect of the uniaxial medium 32 having a positive optical anisotropy. Namely, reference numeral $\theta$ designates an angle formed between the visual angular direction V and a direction perpendicular to a plane CP of the liquid crystal cell. Reference numeral M designates a projecting direction on the plane CP with respect to an orientation direction AD of the liquid crystal molecule. Reference numeral $\phi$ designates an angle formed between the projecting direction M and a projecting direction of the visual angular direction V on the plane CP.

Figure 3A:
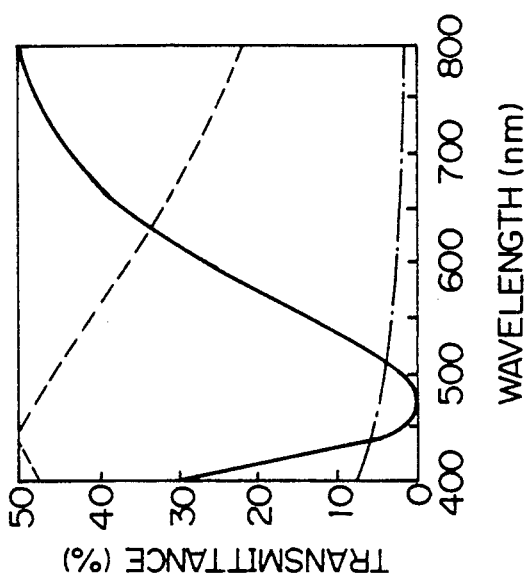
FIGS. 3a to 3c are graphs showing that a spectrum of a general liquid crystal display element depends on a visual angle.
Figure 3B:
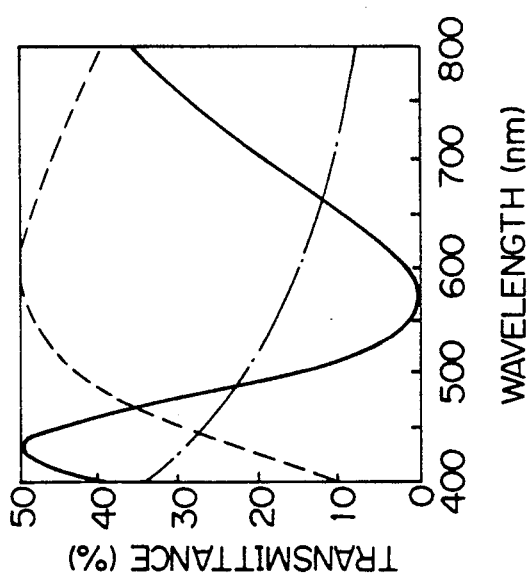
Figure 3C:
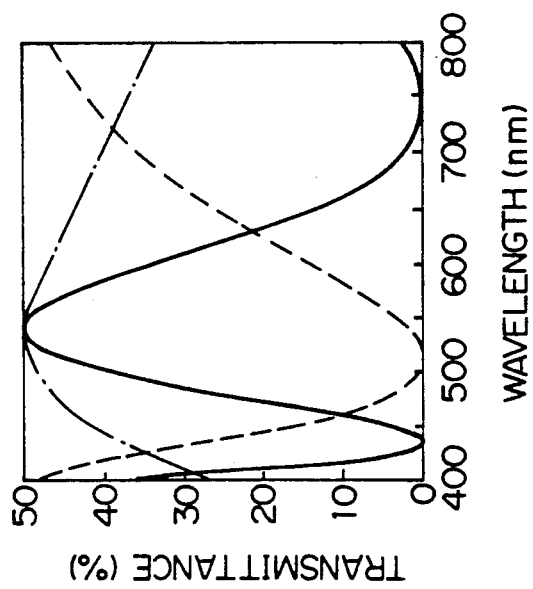

When a voltage is applied to the liquid crystal display element of the ECB type, the orientation state of the liquid crystal molecule is changed and retardation is then changed, thereby changing a displayed color. FIGS. 3a to 3c show that a spectrum depends on the visual angle in a direction shown by $\phi=0°$ when the above voltage is adjusted such that a color seen on the front side of a general liquid crystal display element of the ECB type is respectively green, blue and red. In these figures, solid and broken lines and one dotted chain line respectively show the cases of $\theta=0°$, $\theta=20°$ and $\theta=40°$. As can be seen from these figures, in the general liquid crystal display element of the ECB type, the spectrum is greatly changed in accordance with the visual angle $\theta$ so that the dependence of the displayed color on the visual angle is large.

Figure 4A:
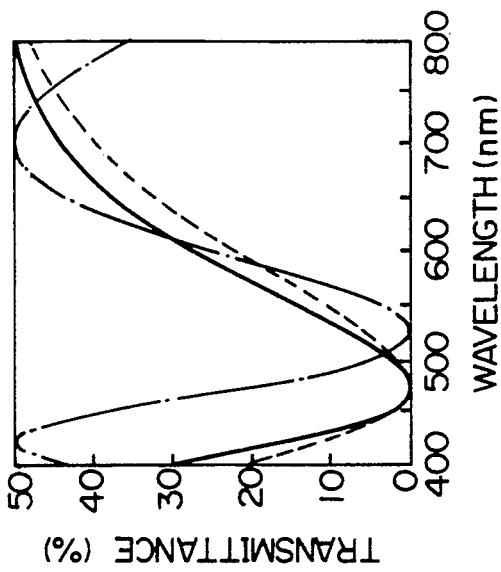
FIGS. 4a to 4c are graphs showing that a spectrum of the liquid crystal display element in the present invention depends on a visual angle.
Figure 4B:
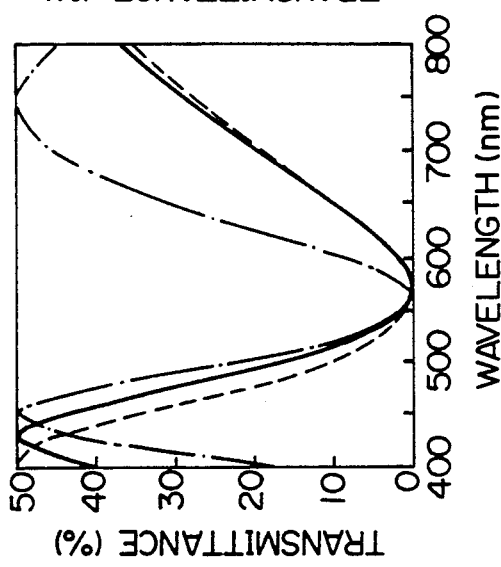
Figure 4C:
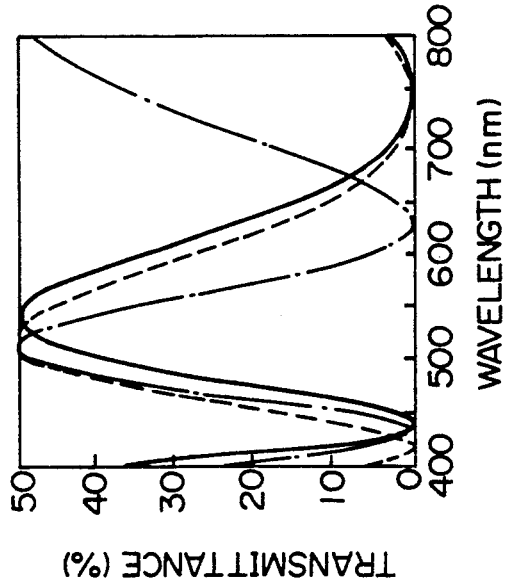

FIGS. 4a to 4c show one example in which a spectrum of the liquid crystal display element of the ECB type in the present invention depends on the visual angle in the direction shown by $\phi=0°$. Similar to FIGS. 3a to 3c, solid and broken lines and one dotted chain line respectively show the cases of $\theta=0°$, $\theta=20°$ and $\theta=40°$. As can be seen from these figures, in the liquid crystal display element of the ECB type in the present invention, the dependence of the spectrum on the visual angle is small in comparison with the general display element so that the dependence of the displayed color on the visual angle is greatly reduced. The following table 1 shows parameters with respect to the uniaxial medium having a positive optical anisotropy and the liquid crystal cell in the liquid crystal display element of the ECB type in the present invention.

TABLE 1

| | |
|---|---|
| Product $d\Delta n$ of thickness d of the liquid crystal layer and birefringence $\Delta n$ of the liquid crystal molecule | 1.4 ($\mu$m) |
| Angle formed between the transmission axis directions of the upper and lower polarizers | 90° |
| Angle formed between the orientation direction of the liquid crystal molecule and the transmission axis of the polarizer | 45° |
| Product $d_1\Delta n_1$ of thickness $d_1$ of the uniaxial medium having a positive optical anisotropy and birefringence $\Delta n_1$ of this medium | 5.5 ($\mu$m) |

The concrete Embodiments 1 to 3 of the present invention will next be described in the following description, but the present invention is not limited to these embodiments.

Embodiment 1

Two orientation films mainly including polyimide are formed on a glass substrate in which a transparent electrode is formed in the shape of a stripe and a rubbing processing is performed with respect to these films. These two orientation films are then stuck together with each other such that a nematic liquid crystal ZL12293 (manufactured by Merck & Co., Inc.) having a positive dielectric anisotropy is arranged between these films, thereby forming a liquid crystal cell. The parameters of the liquid crystal cell are set as shown in the above Table 1. This liquid crystal cell is supported by polarizing plates therebetween and a voltage is applied to this liquid crystal cell. In this case, the displayed color of the liquid crystal cell is greatly changed in accordance with the visual angular direction.

When a pair of polarizing plates are disposed on both sides of the liquid crystal cell formed as above, the liquid crystal display element of the ECB type is manufactured by arranging and supporting a crystal cut in a direction perpendicular to an optical axis direction between an upper polarizing plate and an upper substrate of the liquid crystal cell. The product of the thickness of the crystal and the birefringence thereof is set to 5.5 ($\mu$m). In this element, the dependence of the displayed color on the visual angle is greatly improved.

Embodiment 2

The liquid crystal display element of the ECB type is manufactured by arranging and supporting rutile ($TiO_2$) cut in a direction perpendicular to the optical axis direction between the upper polarizing plate of the liquid crystal cell and the upper substrate thereof in the Embodiment 1. The product of the thickness of the rutile and the birefringence thereof is set to 5.5 ($\mu$m). In this element, the dependence of the displayed color on the visual angle is greatly improved in comparison with a liquid crystal display element having no rutile.

Embodiment 3

A vertical orientation film is formed by coating and calcinating a vertical orientation agent (ODS-E manufactured by Chisso Corporation) on a surface of two substrates. These two substrates are stuck together with each other such that a liquid crystal (ZLI4318 manufactured by Merck & Co., Inc.) having a negative dielectric anisotropy is arranged between these substrates, thereby forming a liquid crystal cell 2. The product of the thickness of a liquid crystal layer of the liquid crystal cell 2 and refractive index anisotropy of a liquid crystal molecule is set to 5.5 $\mu$m.

This liquid crystal cell 2 is disposed to overlap the liquid crystal cell in the Embodiment 1 thereon and is supported by polarizing plates therebetween and a voltage is applied to this liquid crystal cell 2. In this element, the dependence of the displayed color on the visual angle is greatly improved in comparison with a liquid crystal display element having no liquid crystal cell 2.

As mentioned above, in accordance with the present invention, in a liquid crystal display element of the ECB type having a liquid crystal layer homogeneously oriented and disposed between a pair of substrates, a uniaxial medium having a positive optical anisotropy is disposed between the liquid crystal layer and a polarizer. Accordingly, the dependence of a displayed color on the visual angle is greatly improved so that it is possible to provide a liquid crystal display element having an excellent display quality.

In the liquid crystal display element of the ECB type, the orientation states of liquid crystal molecules with respect to the respective displayed colors are different from each other so that the dependences of polarizing states of light transmitted through the liquid crystal cell on the visual angle are different from each other by the displayed colors. When the polarizing states changed in accordance with the visual angular direction are compensated, compensating conditions are different from each other by the displayed colors. Accordingly, when the amount of a product $d_2\Delta n_2$ of refractive index anisotropy $\Delta n_2$ of the uniaxial medium 32 and thickness $d_2$ thereof is changed in accordance with each of the displayed colors, it is possible to sufficiently compensate the change in displayed color caused by the visual angle with respect to the liquid crystal display element of the ECB type. The following table 2 shows parameters with respect to the uniaxial medium 32 having a positive optical anisotropy and the liquid crystal cell in the liquid crystal display element of the ECB type shown in FIGS. 4a to 4c.

TABLE 2

| | |
|---|---|
| Product $d_1\Delta n_1$ of thickness $d_1$ of the liquid crystal layer and refractive index anisotropy $\Delta n_1$ of a liquid crystal molecule | 1.4 ($\mu$m) |
| Angle formed between transmission axis directions of the upper and lower polarizers | 90° |
| Angle formed between the orientation direction of the liquid crystal molecule and the transmission axis of a polarizer | 45° |
| Product $d_2\Delta n_2$ about the uniaxial medium having a positive optical anisotropy with respect to a picture element having green as a displayed color | 6.0 ($\mu$m) |
| Product $d_2\Delta n_2$ about the uniaxial medium having a positive optical anisotropy with respect to a picture element having blue as a displayed color | 5.5 ($\mu$m) |
| Product $d_2\Delta n_2$ about the uniaxial medium having a positive optical anisotropy with respect to a picture element having red as a displayed color | 5.0 ($\mu$m) |

The concrete Embodiment 4 of the present invention will next be described in the following description, but the present invention is not limited to this embodiment.

Embodiment 4

Two orientation films mainly including polyimide are formed on a glass substrate in which a transparent electrode is formed in the shape of a stripe and a rubbing processing is performed with respect to these films. These two orientation films are then stuck together with each other such that a nematic liquid crystal (ZLI2293 manufactured by Merck & Co., Inc.) is arranged between these films, thereby forming a liquid crystal cell A of a dot matrix type. The parameters of the liquid crystal cell are set as shown in the above Table 2. This liquid crystal cell A is supported by polarizing plates therebetween and a voltage is applied to this liquid crystal cell. In this case, the displayed color of the liquid crystal cell A is greatly changed in accordance with the visual angular direction.

Next, a liquid crystal cell B is manufactured as follows by using a glass substrate having recessed and projected portions on a surface thereof and a glass substrate having no recessed and projected portions on a surface thereof so as to provide a homeotropic orientation with respect to a liquid crystal layer between these two glass substrates.

Figure 5:
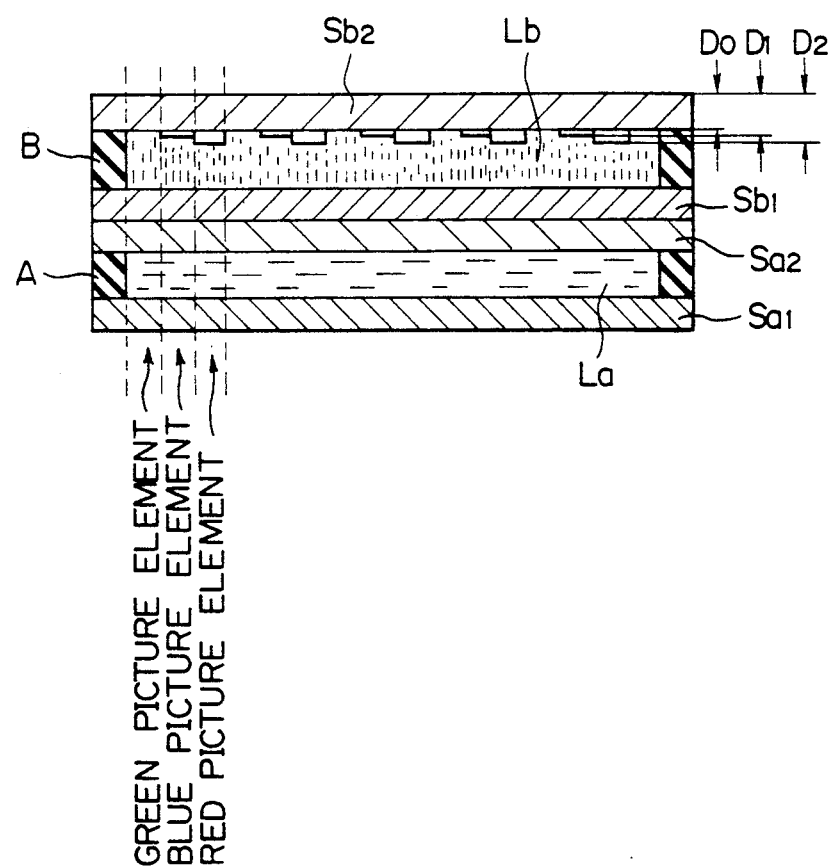
FIG. 5 is a cross-sectional view for explaining a liquid crystal display element in another embodiment of the present invention.

First, as shown in FIG. 5, a substrate $Sb_2$ having recessed and projected portions on a surface thereof is formed such that the thickness of this substrate is set at three stages and any one of these three thicknesses is set every region corresponding to each of dots of the liquid crystal cell A. The thickness of this substrate at the three stages is provided by the following method. In the following description, the difference between the substrate thickness $D_0$ before the change in thickness thereof and an intermediate substrate thickness $D_1$ is set to $H_1$. Further, the difference between the substrate thickness $D_0$ and a maximum substrate thickness $D_2$ is set to $H_2$. First, a surface of the substrate having the thickness $D_0$ is coated with a UV hardening photo resist (Photorec RW-101 manufactured by Sekisui fine chemical Co., Ltd.) having thickness $H_1$. Then, this substrate is developed by performing UV irradiation using a photo mask for masking a region for setting the substrate thickness to $D_0$, thereby making regions for providing the substrate thicknesses $D_0$ and $D_1$. Next, a substrate surface is coated with a UV hardening photo resist as above having thickness $H_2$. Then, this substrate is developed by performing the UV irradiation using a photo mask for masking regions for setting the substrate thickness to $D_0$ and $D_1$, thereby making regions for providing the substrate thicknesses $D_0$, $D_1$ and $D_2$.

Surfaces of the substrate $Sb_2$ manufactured as above and the substrate $Sb_1$ having no recessed and projected portions on a surface thereof are coated with a vertical orientation agent (ODS-E manufactured by Chisso Corporation) to respectively form vertical orientation films. These two substrates $Sb_1$ and $Sb_2$ are stuck together with each other such that a liquid crystal (ZLI4318 manufactured by Merck & Co., Inc.) having a negative dielectric anisotropy is arranged between these substrates, thereby forming the liquid crystal cell B. The amounts of three kinds of cell gaps with respect to this liquid crystal cell B are set such that the products $d_2\Delta n_2$ of the refractive index anisotropy ($\Delta n_2 = 0.1243$) of the liquid crystal used in the liquid crystal cell B and the three kinds of cell gaps are provided as the three kinds of values shown in the Table 2. Namely, the gaps in regions of the liquid crystal cell B corresponding to green, blue and red picture elements of the liquid crystal cell A are respectively set to 48.3, 44.3 and 40.2 ($\mu$m). The thicknesses of UV hardening resin in the regions of the liquid crystal cell B corresponding to the blue and red picture elements of the liquid crystal cell A are respectively set to 8.1 and 4.1 ($\mu$m).

The respective picture elements of the liquid crystal cell A and the corresponding regions of the liquid crystal cell B are overlapped to be in conformity with each other. The overlapped cells are supported by a pair of polarizing plates therebetween and a voltage is applied to these cells. The dependence of the displayed color on the visual color is greatly improved in comparison with the case in which the liquid crystal cell A is supported by the polarizing plates therebetween.

As mentioned above in detail, in accordance with the present invention, in a liquid crystal display element of the ECB type having a liquid crystal layer homogeneously oriented between a pair of substrates, a uniaxial medium having a positive optical anisotropy is disposed between the liquid crystal layer and a polarizer such that the products of refractive index anisotropy and thickness of the uniaxial medium are different from each other in accordance with the difference between displayed colors. Accordingly, it is possible to greatly improve the dependence of the displayed color on the visual angle and provide a liquid crystal display element having an excellent display quality.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal display element, comprising:
   a liquid crystal cell including a layer of a nematic liquid crystal material having a positive dielectric anisotropy, said layer being sandwiched between a pair of substrates each provided with an electrode, molecules of said liquid crystal material being homogeneously oriented substantially parallel to each of surfaces of said substrates when a voltage is not applied;
   a pair of polarizers disposed such that said liquid crystal cell is sandwiched between said polarizers, and such that a direction of a transmission axis of each of said polarizers adjacent to said layer is shifted from an orientation direction of said molecules; and
   a uniaxial medium disposed between said liquid crystal cell and one of said polarizers for compensating for dependence of a spectrum of a light on a visual angle, said light being transmitted through said liquid crystal cell, said uniaxial medium having a positive optical anisotropy, and being arranged such that an optical axis thereof makes a right angle with a surface of the substrate of said cell which is adjacent to said uniaxial medium.

2. A liquid crystal display element according to claim 1, in which said polarizers are arranged such that directions of respective transmission axes thereof make an angle of 90° to each other.

3. A liquid crystal display element according to claim 2, in which said polarizers are arranged such that each of said transmission axes makes an angle of 45° with said orientation direction of said molecules.

4. A liquid crystal display element according to claim 3, in which a product of a refractive index anisotropy and a thickness of said uniaxial medium is set to a predetermined value in accordance with a product of a refractive index anisotropy and a thickness of said layer.

5. A liquid crystal display element according to claim 4, which is so adapted that products of said refractive index anisotropy and said thickness of said uniaxial medium are different from each other in accordance with a difference between displayed colors which are determined at every display picture element.

6. A liquid crystal display element according to claim 1, in which said uniaxial medium is formed by cutting a monocrystal having a positive optical anisotropy along a direction perpendicular to said optical axis.

7. A liquid crystal display element according to claim 1, in which said uniaxial medium is formed by a liquid crystal cell including another layer of a liquid crystal material having a negative dielectric anisotropy, said another layer being sandwiched between another pair of substrates, molecules of said liquid crystal material being oriented homeotropically to each of surfaces of said substrates.

8. A liquid crystal display element according to claim 7, in which one of said substrates is provided with a recessed portion and a projected portion on an inner surface thereof so that products of a refractive index anisotropy and a thickness of said another layer are different from each other in accordance with a difference between displayed colors which are determined at every display picture element.

* * * * *